(12) United States Patent
Adams et al.

(10) Patent No.: US 9,002,867 B1
(45) Date of Patent: Apr. 7, 2015

(54) MODIFYING RANKING DATA BASED ON DOCUMENT CHANGES

(75) Inventors: Henele I. Adams, San Francisco, CA (US); Hyung-Jin Kim, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 411 days.

(21) Appl. No.: 12/982,633

(22) Filed: Dec. 30, 2010

(51) Int. Cl.
*G06F 17/30* (2006.01)

(52) U.S. Cl.
CPC .............................. *G06F 17/30345* (2013.01)

(58) Field of Classification Search
None
See application file for complete search history.

(56) References Cited

U.S. PATENT DOCUMENTS

| | | | |
|---|---|---|---|
| 5,265,065 A | 11/1993 | Turtle | |
| 5,488,725 A | 1/1996 | Turtle | |
| 5,696,962 A | 12/1997 | Kupiec | |
| 5,920,854 A | 7/1999 | Kirsch et al. | |
| 5,963,940 A | 10/1999 | Liddy et al. | |
| 6,006,222 A | 12/1999 | Culliss | |
| 6,006,225 A | 12/1999 | Bowman et al. | |
| 6,014,665 A | 1/2000 | Culliss | |
| 6,026,388 A | 2/2000 | Liddy et al. | |
| 6,067,565 A | 5/2000 | Horvitz | |
| 6,078,916 A | 6/2000 | Culliss | |
| 6,078,917 A | 6/2000 | Paulsen et al. | |
| 6,088,692 A | 7/2000 | Driscoll | |
| 6,134,532 A | 10/2000 | Lazarus et al. | |
| 6,182,066 B1 | 1/2001 | Marques et al. | |
| 6,182,068 B1 | 1/2001 | Culliss | |
| 6,185,559 B1 | 2/2001 | Brin et al. | |
| 6,249,252 B1 | 6/2001 | Dupray | |
| 6,269,368 B1 | 7/2001 | Diamond | |
| 6,285,999 B1 | 9/2001 | Page | |
| 6,321,228 B1 | 11/2001 | Crandall et al. | |
| 6,327,590 B1 | 12/2001 | Chidlovskii et al. | |

(Continued)

FOREIGN PATENT DOCUMENTS

| | | |
|---|---|---|
| WO | WO 00/77689 | 12/2000 |
| WO | WO 01/16807 | 3/2001 |

(Continued)

OTHER PUBLICATIONS

Agichtein, et al; *Improving Web Search Ranking by Incorporating User Behavior Information*; Aug. 2006; Proceedings of the Twenty-Ninth Annual International ACM SIGIR Conference on Research and Development in Information Retrieval, p. 19-26.

(Continued)

*Primary Examiner* — Syling Yen
(74) *Attorney, Agent, or Firm* — Fish & Richardson P.C.

(57) ABSTRACT

Methods, systems, and apparatus, including computer programs encoded on computer storage media for determining a weighted overall quality of result statistic for a document. One method includes receiving quality of result data for a query and a plurality of versions of a document, determining a weighted overall quality of result statistic for the document with respect to the query including weighting each version specific quality of result statistic and combining the weighted version-specific quality of result statistics, wherein each quality of result statistic is weighted by a weight determined from at least a difference between content of a reference version of the document and content of the version of the document corresponding to the version specific quality of result statistic, and storing the weighted overall quality of result statistic and data associating the query and the document with the weighted overall quality of result statistic.

39 Claims, 6 Drawing Sheets

(56) References Cited

U.S. PATENT DOCUMENTS

| | | |
|---|---|---|
| 6,341,283 B1 | 1/2002 | Yamakawa et al. |
| 6,353,849 B1 | 3/2002 | Linsk |
| 6,363,378 B1 | 3/2002 | Conklin et al. |
| 6,370,526 B1 | 4/2002 | Agrawal et al. |
| 6,421,675 B1 | 7/2002 | Ryan et al. |
| 6,473,752 B1 | 10/2002 | Fleming, III |
| 6,480,843 B2 | 11/2002 | Li |
| 6,490,575 B1 | 12/2002 | Berstis |
| 6,526,440 B1 | 2/2003 | Bharat |
| 6,529,903 B2 | 3/2003 | Smith et al. |
| 6,539,377 B1 | 3/2003 | Culliss |
| 6,560,590 B1 | 5/2003 | Shwe et al. |
| 6,567,103 B1 | 5/2003 | Chaudhry |
| 6,587,848 B1 | 7/2003 | Aggarwal et al. |
| 6,615,209 B1 | 9/2003 | Gomes |
| 6,623,529 B1 | 9/2003 | Lakritz |
| 6,640,218 B1 | 10/2003 | Golding et al. |
| 6,658,423 B1 | 12/2003 | Pugh et al. |
| 6,671,681 B1 | 12/2003 | Emens et al. |
| 6,678,681 B1 | 1/2004 | Brin et al. |
| 6,701,309 B1 | 3/2004 | Beeferman et al. |
| 6,725,259 B1 | 4/2004 | Bharat |
| 6,738,764 B2 | 5/2004 | Mao et al. |
| 6,754,873 B1 | 6/2004 | Law et al. |
| 6,792,416 B2 | 9/2004 | Soetarman et al. |
| 6,795,820 B2 | 9/2004 | Barnett |
| 6,816,850 B2 | 11/2004 | Culliss |
| 6,853,993 B2 | 2/2005 | Ortega et al. |
| 6,873,982 B1 | 3/2005 | Bates et al. |
| 6,877,002 B2 | 4/2005 | Prince |
| 6,882,999 B2 | 4/2005 | Cohen et al. |
| 6,901,402 B1 | 5/2005 | Corston-Oliver et al. |
| 6,912,505 B2 | 6/2005 | Linden et al. |
| 6,944,611 B2 | 9/2005 | Flank et al. |
| 6,944,612 B2 | 9/2005 | Roustant et al. |
| 6,954,750 B2 | 10/2005 | Bradford |
| 6,990,453 B2 | 1/2006 | Wang et al. |
| 7,016,939 B1 | 3/2006 | Rothwell et al. |
| 7,028,027 B1 | 4/2006 | Zha et al. |
| 7,072,886 B2 | 7/2006 | Salmenkaita et al. |
| 7,085,761 B2 | 8/2006 | Shibata |
| 7,113,939 B2 | 9/2006 | Chou et al. |
| 7,117,206 B1 | 10/2006 | Bharat et al. |
| 7,136,849 B2 | 11/2006 | Patrick |
| 7,146,361 B2 | 12/2006 | Broder et al. |
| 7,222,127 B1 | 5/2007 | Bem et al. |
| 7,231,399 B1 | 6/2007 | Bem et al. |
| 7,243,102 B1 | 7/2007 | Naam et al. |
| 7,249,126 B1 | 7/2007 | Ginsburg et al. |
| 7,266,765 B2 | 9/2007 | Golovchinsky et al. |
| 7,293,016 B1 | 11/2007 | Shakib et al. |
| 7,379,951 B2 | 5/2008 | Chkodrov et al. |
| 7,382,358 B2 | 6/2008 | Kushler et al. |
| 7,395,222 B1 | 7/2008 | Sotos |
| 7,426,507 B1 | 9/2008 | Patterson |
| 7,451,487 B2 | 11/2008 | Oliver et al. |
| 7,499,919 B2 | 3/2009 | Meyerzon et al. |
| 7,516,146 B2 | 4/2009 | Robertson et al. |
| 7,526,470 B1 | 4/2009 | Karnawat et al. |
| 7,533,092 B2 | 5/2009 | Berkhin et al. |
| 7,533,130 B2 | 5/2009 | Narayana et al. |
| 7,552,112 B2 | 6/2009 | Jhala et al. |
| 7,565,363 B2 | 7/2009 | Anwar |
| 7,565,367 B2 | 7/2009 | Barrett et al. |
| 7,566,363 B2 | 7/2009 | Starling et al. |
| 7,574,530 B2 | 8/2009 | Wang et al. |
| 7,584,181 B2 | 9/2009 | Zeng et al. |
| 7,603,350 B1 | 10/2009 | Guha |
| 7,610,282 B1 | 10/2009 | Datar et al. |
| 7,636,714 B1 | 12/2009 | Lamping et al. |
| 7,657,626 B1 | 2/2010 | Zwicky |
| 7,676,507 B2 | 3/2010 | Maim |
| 7,680,775 B2 | 3/2010 | Levin et al. |
| 7,693,818 B2 | 4/2010 | Majumder |
| 7,716,225 B1 | 5/2010 | Dean et al. |
| 7,747,612 B2 | 6/2010 | Thun et al. |
| 7,756,887 B1 | 7/2010 | Haveliwala |
| 7,783,632 B2 | 8/2010 | Richardson et al. |
| 7,801,885 B1 | 9/2010 | Verma |
| 7,809,716 B2 | 10/2010 | Wang et al. |
| 7,818,315 B2 | 10/2010 | Cucerzan et al. |
| 7,818,320 B2 | 10/2010 | Makeev |
| 7,836,058 B2 | 11/2010 | Chellapilla et al. |
| 7,844,589 B2 | 11/2010 | Wang et al. |
| 7,849,089 B2 | 12/2010 | Zhang et al. |
| 7,853,557 B2 | 12/2010 | Schneider et al. |
| 7,856,446 B2 | 12/2010 | Brave et al. |
| 7,877,404 B2 | 1/2011 | Achan et al. |
| 7,895,177 B2 | 2/2011 | Wu |
| 7,925,498 B1 | 4/2011 | Baker et al. |
| 7,925,649 B2 | 4/2011 | Jeh et al. |
| 7,953,740 B1 | 5/2011 | Vadon et al. |
| 7,974,974 B2 | 7/2011 | Tankovich et al. |
| 7,987,185 B1 | 7/2011 | Mysen et al. |
| 8,001,136 B1 | 8/2011 | Papachristou et al. |
| 8,019,650 B2 | 9/2011 | Donsbach et al. |
| 8,024,325 B2 | 9/2011 | Zhang et al. |
| 8,024,330 B1 | 9/2011 | Franco et al. |
| 8,027,439 B2 | 9/2011 | Zoldi et al. |
| 8,037,042 B2 | 10/2011 | Anderson et al. |
| 8,037,086 B1 | 10/2011 | Upstill et al. |
| 8,051,061 B2 | 11/2011 | Niu et al. |
| 8,060,456 B2 | 11/2011 | Gao et al. |
| 8,060,497 B1 | 11/2011 | Zatsman et al. |
| 8,065,296 B1 | 11/2011 | Franz et al. |
| 8,069,182 B2 | 11/2011 | Pieper |
| 8,073,263 B2 | 12/2011 | Hull et al. |
| 8,073,772 B2 | 12/2011 | Bishop et al. |
| 8,073,867 B2 | 12/2011 | Chowdhury |
| 8,082,242 B1 | 12/2011 | Mysen et al. |
| 8,086,282 B2 | 12/2011 | Hellberg |
| 8,086,599 B1 | 12/2011 | Heymans |
| 8,090,717 B1 | 1/2012 | Bharat et al. |
| 8,156,111 B2 | 4/2012 | Jones et al. |
| 8,224,827 B2 | 7/2012 | Dean et al. |
| 8,239,370 B2 | 8/2012 | Wong et al. |
| 8,412,699 B1 | 4/2013 | Mukherjee et al. |
| 8,458,165 B2 | 6/2013 | Liao et al. |
| 8,583,636 B1 | 11/2013 | Franz et al. |
| 2001/0000356 A1 | 4/2001 | Woods |
| 2002/0034292 A1 | 3/2002 | Tuoriniemi et al. |
| 2002/0042791 A1 | 4/2002 | Smith et al. |
| 2002/0049752 A1 | 4/2002 | Bowman et al. |
| 2002/0103790 A1 | 8/2002 | Wang et al. |
| 2002/0123988 A1 | 9/2002 | Dean et al. |
| 2002/0133481 A1 | 9/2002 | Smith et al. |
| 2002/0165849 A1 | 11/2002 | Singh et al. |
| 2003/0009399 A1 | 1/2003 | Boerner |
| 2003/0018707 A1 | 1/2003 | Flocken |
| 2003/0028529 A1 | 2/2003 | Cheung et al. |
| 2003/0037074 A1 | 2/2003 | Dwork et al. |
| 2003/0078914 A1 | 4/2003 | Witbrock |
| 2003/0120654 A1 | 6/2003 | Edlund et al. |
| 2003/0135490 A1 | 7/2003 | Barrett et al. |
| 2003/0149704 A1 | 8/2003 | Yayoi et al. |
| 2003/0167252 A1 | 9/2003 | Odom et al. |
| 2003/0187837 A1 | 10/2003 | Culliss |
| 2003/0195877 A1 | 10/2003 | Ford et al. |
| 2003/0204495 A1 | 10/2003 | Lehnert |
| 2003/0220913 A1 | 11/2003 | Doganata et al. |
| 2003/0229640 A1 | 12/2003 | Carlson et al. |
| 2004/0006456 A1 | 1/2004 | Loofbourrow |
| 2004/0006740 A1 | 1/2004 | Krohn et al. |
| 2004/0034632 A1 | 2/2004 | Carmel et al. |
| 2004/0049486 A1 | 3/2004 | Scanlon et al. |
| 2004/0059708 A1 | 3/2004 | Dean et al. |
| 2004/0083205 A1 | 4/2004 | Yeager |
| 2004/0093325 A1 | 5/2004 | Banerjee et al. |
| 2004/0119740 A1 | 6/2004 | Chang et al. |
| 2004/0122811 A1 | 6/2004 | Page |
| 2004/0153472 A1 | 8/2004 | Rieffanaugh, Jr. |
| 2004/0158560 A1 | 8/2004 | Wen et al. |
| 2004/0186828 A1 | 9/2004 | Yadav |
| 2004/0186996 A1 | 9/2004 | Gibbs et al. |

(56) References Cited

U.S. PATENT DOCUMENTS

| | | |
|---|---|---|
| 2004/0199419 A1 | 10/2004 | Kim et al. |
| 2004/0215607 A1 | 10/2004 | Travis, Jr. |
| 2005/0015366 A1 | 1/2005 | Carrasco et al. |
| 2005/0021397 A1 | 1/2005 | Cui et al. |
| 2005/0027691 A1 | 2/2005 | Brin et al. |
| 2005/0033803 A1 | 2/2005 | Vleet et al. |
| 2005/0050014 A1 | 3/2005 | Gosse et al. |
| 2005/0055342 A1 | 3/2005 | Bharat et al. |
| 2005/0055345 A1 | 3/2005 | Ripley |
| 2005/0060290 A1 | 3/2005 | Herscovici et al. |
| 2005/0060310 A1 | 3/2005 | Tong et al. |
| 2005/0060311 A1 | 3/2005 | Tong et al. |
| 2005/0071741 A1 | 3/2005 | Acharya et al. |
| 2005/0102282 A1 | 5/2005 | Linden |
| 2005/0125376 A1 | 6/2005 | Curtis et al. |
| 2005/0160083 A1 | 7/2005 | Robinson |
| 2005/0192946 A1 | 9/2005 | Lu et al. |
| 2005/0198026 A1 | 9/2005 | Dehlinger et al. |
| 2005/0222987 A1 | 10/2005 | Vadon |
| 2005/0222998 A1 | 10/2005 | Driessen et al. |
| 2005/0240576 A1 | 10/2005 | Piscitello et al. |
| 2005/0240580 A1 | 10/2005 | Zamir et al. |
| 2005/0256848 A1 | 11/2005 | Alpert et al. |
| 2006/0036593 A1 | 2/2006 | Dean et al. |
| 2006/0047643 A1 | 3/2006 | Chaman |
| 2006/0069667 A1 | 3/2006 | Manasse et al. |
| 2006/0074903 A1 | 4/2006 | Meyerzon et al. |
| 2006/0089926 A1 | 4/2006 | Knepper et al. |
| 2006/0095421 A1* | 5/2006 | Nagai et al. ................. 707/3 |
| 2006/0106793 A1 | 5/2006 | Liang |
| 2006/0123014 A1 | 6/2006 | Ng |
| 2006/0173830 A1 | 8/2006 | Smyth et al. |
| 2006/0195443 A1 | 8/2006 | Franklin et al. |
| 2006/0200476 A1 | 9/2006 | Gottumukkala et al. |
| 2006/0200556 A1 | 9/2006 | Brave et al. |
| 2006/0227992 A1 | 10/2006 | Rathus et al. |
| 2006/0230040 A1 | 10/2006 | Curtis et al. |
| 2006/0259476 A1 | 11/2006 | Kadayam et al. |
| 2006/0293950 A1 | 12/2006 | Meek et al. |
| 2007/0005575 A1 | 1/2007 | Dai et al. |
| 2007/0005588 A1 | 1/2007 | Zhang et al. |
| 2007/0038659 A1 | 2/2007 | Datar et al. |
| 2007/0050339 A1 | 3/2007 | Kasperski et al. |
| 2007/0061195 A1 | 3/2007 | Liu et al. |
| 2007/0061211 A1 | 3/2007 | Ramer et al. |
| 2007/0081197 A1 | 4/2007 | Omoigui |
| 2007/0106659 A1 | 5/2007 | Lu et al. |
| 2007/0112730 A1 | 5/2007 | Gulli et al. |
| 2007/0130370 A1 | 6/2007 | Akaezuwa |
| 2007/0156677 A1 | 7/2007 | Szabo |
| 2007/0172155 A1 | 7/2007 | Guckenberger |
| 2007/0180355 A1 | 8/2007 | McCall et al. |
| 2007/0192190 A1 | 8/2007 | Granville |
| 2007/0208730 A1 | 9/2007 | Agichtein et al. |
| 2007/0214131 A1 | 9/2007 | Cucerzan et al. |
| 2007/0233653 A1 | 10/2007 | Biggs et al. |
| 2007/0255689 A1 | 11/2007 | Sun et al. |
| 2007/0260596 A1 | 11/2007 | Koran et al. |
| 2007/0260597 A1 | 11/2007 | Cramer |
| 2007/0266021 A1 | 11/2007 | Aravamudan et al. |
| 2007/0266439 A1 | 11/2007 | Kraft |
| 2007/0288450 A1 | 12/2007 | Datta et al. |
| 2008/0010143 A1 | 1/2008 | Kniaz et al. |
| 2008/0027913 A1 | 1/2008 | Chang et al. |
| 2008/0052219 A1 | 2/2008 | Sandholm et al. |
| 2008/0052273 A1 | 2/2008 | Pickens |
| 2008/0059453 A1 | 3/2008 | Laderman |
| 2008/0077570 A1 | 3/2008 | Tang et al. |
| 2008/0082518 A1 | 4/2008 | Loftesness |
| 2008/0091650 A1 | 4/2008 | Fontoura et al. |
| 2008/0104043 A1 | 5/2008 | Garg et al. |
| 2008/0114624 A1 | 5/2008 | Kitts |
| 2008/0114729 A1 | 5/2008 | Raman et al. |
| 2008/0114750 A1 | 5/2008 | Saxena et al. |
| 2008/0140699 A1 | 6/2008 | Jones et al. |
| 2008/0162475 A1 | 7/2008 | Meggs et al. |
| 2008/0183660 A1 | 7/2008 | Szulczewski |
| 2008/0189269 A1 | 8/2008 | Olsen |
| 2008/0228442 A1 | 9/2008 | Lippincott et al. |
| 2008/0256050 A1 | 10/2008 | Zhang et al. |
| 2008/0313168 A1 | 12/2008 | Liu et al. |
| 2008/0313247 A1 | 12/2008 | Galvin |
| 2009/0006438 A1 | 1/2009 | Tunkelang et al. |
| 2009/0012969 A1* | 1/2009 | Rail et al. ................. 707/100 |
| 2009/0055392 A1 | 2/2009 | Gupta et al. |
| 2009/0157643 A1 | 6/2009 | Gollapudi et al. |
| 2009/0182723 A1 | 7/2009 | Shnitko et al. |
| 2009/0187557 A1 | 7/2009 | Hansen et al. |
| 2009/0228442 A1 | 9/2009 | Adams et al. |
| 2009/0287656 A1 | 11/2009 | Bennett |
| 2009/0313242 A1 | 12/2009 | Kodama |
| 2010/0106706 A1 | 4/2010 | Rorex et al. |
| 2010/0131563 A1 | 5/2010 | Yin |
| 2010/0205541 A1 | 8/2010 | Rapaport et al. |
| 2010/0228738 A1 | 9/2010 | Mehta et al. |
| 2010/0241472 A1 | 9/2010 | Hernandez |
| 2010/0299317 A1 | 11/2010 | Uy |
| 2010/0325131 A1* | 12/2010 | Dumais et al. ................. 707/759 |
| 2011/0179093 A1* | 7/2011 | Pike et al. ................. 707/812 |
| 2011/0219025 A1 | 9/2011 | Lipson et al. |
| 2011/0264670 A1 | 10/2011 | Banerjee et al. |
| 2011/0282906 A1 | 11/2011 | Wong |
| 2011/0295844 A1* | 12/2011 | Sun et al. ................. 707/723 |
| 2011/0295879 A1 | 12/2011 | Logis et al. |
| 2012/0011148 A1 | 1/2012 | Rathus et al. |
| 2012/0191705 A1 | 7/2012 | Tong et al. |

FOREIGN PATENT DOCUMENTS

| | | |
|---|---|---|
| WO | WO 01/67297 | 9/2001 |
| WO | WO 2004/059514 | 7/2004 |

OTHER PUBLICATIONS

Agichtein, et al; *Learning User Interaction Models for Predicting Web Search Result Performances*; Aug. 2006; Proceedings of the Twenty-Ninth Annual International ACM SIGIR Conference on Research and Development in Information Retrieval, p. 3-10.

Bar-Llan et al., "Presentation Bias is Significant in Determining User Preference for Search Results—A User Study"; Journal of the American Society for Information Science and Technology, vol. 60, Issue 1 (p. 135-149), Sep. 2008, 15 pages.

Bar-Llan et al.; "Methods for comparing rankings of search engine results"; Computer Networks: The International Journal of Computer and Telecommunications Networking, Jul. 2006, vol. 50, Issue 10, 19 pages.

Boldi, et al.; *The Query-flow Graph: Model and Applications*; CKIM '08, Oct. 26-30, Napa Valley, California, USA, pp. 609-617.

Boyan et al.; *A Machine Learning Architecture for Optimizing Web Search Engines*; Aug. 1996; Internet-based information systems—Workshop Technical Report—American Association for Artificial Intelligence, p. 1-8.

Burke, Robin, Integrating Knowledge-based and Collaborative-filtering Recommender Systems, AAAI Technical Report WS-99-01. Compilation copyright © 1999, AAAI (www.aaai.org), pp. 69-72.

Craswell, et al.; *Random Walks on the Click Graph*; Jul. 2007; SIGIR '07, Amsterdam, the Netherlands, 8 pages.

Cutrell, et al.; *Eye tracking in MSN Search: Investigating snippet length, target position and task types*; 2007; Conference on Human Factors in Computing Systems—Proceedings of the SIGCHI Conference on Human Factors in Computing Systems.

Diligenti, et al., *Users, Queries and Documents: A Unified Representation for Web Mining*, wi-iat, vol. 1, 2009 IEEE/WIC/ACM International Joint Conference on Web Intelligence and Intelligent Agent Technology, 2009, pp. 238-244.

Hofmann, Thomas, *Latent Semantic Models for Collaborative Filtering*, ACM Transactions on Information Systems, vol. 22, No. 1, Jan. 2004, pp. 89-115.

Google News archive, Jul. 8, 2003, Webmasterworld.com, [online] Retrieved from the Internet http://www.webmasterwolrd.com/forum3/15085.htm [retrieved on Nov. 20, 2009] 3 pages.

(56) References Cited

OTHER PUBLICATIONS

Grčar, Miha, *User Profiling: Collaborative Filtering*, SIKDD 2004, Oct. 12-15, 2004, Ljubljana, Slovenia, 4 pages.
Joachims, T., Evaluating retrieval performance using clickthrough data. Proceedings of the SIGIR Workshop on Mathematical/Formal Methods in Information Retrieval; Aug. 12-15, 2002, Tampere, Finland, 18 pages.
Joachims; *Optimizing search engines using clickthrough data*; 2002; Proceedings of the ACM SIGKDD International Conference on Knowledge Discovery and Data Mining, p. 133-142.
Joachims et al., "Search Engines that Learn from Implicit Feedback"; Aug. 2007, IEEE Computer Society.
Kelly, et al.; *Implicit Feedback for Inferring User Preference: A Bibliography*; SIGIR Forum, vol. 37, No. 2 (2003), pp. 18-28.
Linden, Greg et al., *Amazon.com Recommendations: Item-to-Item Collaborative Filtering*, [online], http://computer.org/internet/, IEEE Internet Computing, Jan.-Feb. 2003, IEEE Computer Society, pp. 76-80.
U.S. Appl. No. 11/556,143, filed Nov. 2, 2006, in Office Action mailed Jan. 25, 2010, 14 pages.
U.S. Appl. No. 11/556,143, filed Nov. 2, 2006, in Office Action mailed Jul. 6, 2010, 20 pages.
U.S. Appl. No. 11/556,143, filed Nov. 2, 2006, in Office Action mailed Apr. 20, 2011, 18 pages.
Nicole, Kristen, Heeii is StumbleUpon Plus Google Suggestions, [online], Retrieved from the Internet http://mashable.com/2007/05/15/heeii/, 11 pages.
Lemire, Daniel, *Scale and Translation Invariant Collaborative Filtering Systems*, Published in Information Retrieval, 8(1), pp. 129-150, 2005.
U.S. Appl. No. 11/685,095, filed Mar. 12, 2007, in Office Action mailed Feb. 8, 2010, 31 pages.
U.S. Appl. No. 11/685,095, filed Mar. 12, 2007, in Office Action mailed Feb. 25, 2009, 21 pages.
U.S. Appl. No. 11/685,095, filed Mar. 12, 2007, in Office Action mailed Sep. 10, 2009, 23 pages.
U.S. Appl. No. 11/685,095, filed Mar. 12, 2007, in Office Action mailed Apr. 13, 2011, 31 pages.
Radlinski, et al., *Query Chains: Learning to Rank from Implicit Feedback*, KDD '05, Aug. 21-24, 2005, Chicago, Illinois, USA, 10 pages.
U.S. Appl. No. 11/556,086, filed Nov. 2, 2006, in Office Action mailed Jun. 23, 2010, 21 pages.
Schwab, et al., *Adaptivity through Unobstrusive Learning*, 2002, 16(3), pp. 5-9.
Stoilova, Lubomira et al., *GiveALink: Mining a Semantic Network of Bookmarks for Web Search and Recommendation*, LinkKDD '05, Aug. 21, 2005, Chicago, IL, USA, 8 pages.
W3C, URIs, URLs and URNs: Classification and Recommendations 1.0, Report from the joint W3C/IETF URI Planning Interest Group, Sep. 21, 2001, 8 pages.
Xiao, et al., *Measuring Similarity of Interests for Clustering Web-Users*, ADC, 2001, pp. 107-114.
Xie et al., *Web User Clustering from Access Log Using Belief Function*, K-CAP '01, Oct. 22-23, 2001, Victoria, British Columbia, Canada, pp. 202-208.
Yu et al., *Selecting Relevant Instances for Efficient and Accurate Collaborative Filtering*, CIKM '01, Nov. 5-10, 2001, Atlanta, Georgia, pp. 239-246.
Zeng et al., *Similarity Measure and Instance Selection for Collaborative Filtering*, WWW '03, May 20-24, 2003, Budapest, Hungary, pp. 652-658.

Zeng, et al., "Learning to Cluster Web Search Results", SIGIR '04, Proceedings of the 27th Annual International ACM SIGIR conference on research and development in information retrieval, 2004.
Soumen Chakrabarti, et al. "Enhanced Topic Distillation using Text, Markup tags, and Hyperlinks". ACM 2001, pp. 208-216.
Gabriel Somlo et al., "Using Web Hepler Agent Profiles in Query Generation", ACM, Jul. 2003, pp. 812-818.
Australian Patent Office Non-Final Office Action in AU App. Ser. No. 2004275274, mailed Feb. 3, 2010, 2 pages.
Dan Olsen et al., "Query-by-critique: Spoken Language Access to Large Lists", ACM, Oct. 2002, pp. 131-140.
Susan Gauch et al., "A Corpus Analysis Approach for Automatic Query Expansion and its Extension to Multiple Databases", ACM, 1999, pp. 250-269.
Nicolas Bruno et al., "Top-K Selection Queries over Relational Databases: Mapping Strategies and Performance Evaluation", ACM, Jun. 2002, pp. 153-187.
Ji-Rong Wen et al., "Query Clustering using User Logs", ACM, Jan. 2002, pp. 59-81.
Brin, S. and L. Page, The Anatomy of a Large-Scale Hypertextual Web Search Engine, Computer Science Department, 1998.
International Search Report and Written Opinion for Application No. PCT/US2004/029615, dated Jan. 19, 2005, 8 pages.
Hungarian Patent Office, International Search Report and Written Opinion for Application No. 200806756-3, dated Nov. 19, 2010 12 pages.
Authorized Officer Athina Nickitas-Etienne, International Preliminary Report and Written Opinion for Application No. PCT/US2004/029615, mailed Mar. 23, 2006.
Indian Office Action in Indian Application No. 686/KOLNP/2006, mailed Jun. 3, 2008, 2 pages.
Danish Search Report and Written Opinion for Application No. 200601630-7, dated Jun. 21, 2007, 15 pages.
Joachims, "Evaluating Search Engines Using Clickthrough Data", Cornell University, Department of Computer Science, Draft, Feb. 19, 2002, 13 pages.
Joachims; *Optimizing search engines using clickthrough data*; 2002; Proceedings of the ACM SIGKDD International Conference on Knowledge Discovery and Data Mining, p. 133-142, 10 pages.
Jansen et al., "An Analysis of Web Documents Retrieved and Viewed", School of Information Sciences and Technology, The Pennsylvania State University, the 4th International Conference on Internet Computing, Las Vegas, Nevada, pp. 65-69, Jun. 23-26, 2003, 5 pages.
Jones et al., "Pictures of Relevance: A Geometric Analysis of Similarity Measures", Journal of the American Society for Information Science, Nov. 1987, 23 pages.
Kaplan et al., "Adaptive Hypertext Navigation Based on User Goals and Context", User Modeling and User-Adapted Interaction 2, Sep. 1, 1993; pp. 193-220, 28 pages.
Liddy et al., "A Natural Language Text Retrieval System With Relevance Feedback", 16th National Online, May 2-6, 1995, 3 pages.
"Personalizing Search via Automated Analysis of Interests and Activities," by Teevan et al. IN: SIGIR'05 (2005). Available at: ACM.
Baeza-Yates, Ricardo, Carlos Hurtado, and Marcelo Mendoza. "Query recommendation using query logs in search engines." Current Trends in Database Technology-EDBT 2004 Workshops. Springer Berlin Heidelberg, 2005.
Velez, Bienvenido, et al. "Fast and effective query refinement." ACM SIGIR Forum. vol. 31. No. SI. ACM, 1997.
Mandala, Rila, Takenobu Tokunaga, and Hozumi Tanaka. "Combining multiple evidence from different types of thesaurus for query expansion." Proceedings of the 22nd annual international ACM SIGIR conference on Research and development in information retrieval. ACM, 1999.

* cited by examiner

MODIFYING RANKING DATA BASED ON DOCUMENT CHANGES

BACKGROUND

This specification relates to scoring documents responsive to search queries.

Internet search engines provide information about Internet accessible documents (e.g., web pages, images, text documents, multimedia content) that are responsive to a user's search query by returning a set of search results in response to the query. A search result can include, for example, a Uniform Resource Locator (URL) and a snippet of information for each of a number of documents responsive to a query. The search results can be ranked, i.e., placed in an order, according to scores assigned to the search results by a scoring function or process.

The scoring function value for a given document is derived from various indicators, for example, where, and how often, query terms appear in the given document, how common the query terms are in the documents indexed by the search engine, or a query-independent measure of quality of the document itself. Some scoring functions alternatively, or additionally, use quality of result statistics for pairs of queries and documents. These quality of result statistics can be derived from indicators that describe past user behavior. For example, a quality of result statistic for a given document and a given query can be derived from how frequently a user selected a search result corresponding to the given document when the search result was presented on a search results page for the given query.

SUMMARY

A system generates weighted quality of result statistics for documents from version-specific quality of result statistics for different versions of the document by weighting the version-specific quality of result statistics by weights derived from differences between the respective versions of the document and a reference version of the document.

In general, one innovative aspect of the subject matter described in this specification can be embodied in methods that include the actions of determining a weighted overall quality of result statistic for a document with respect to a query from respective version-specific quality of result statistics for each of a plurality of different versions of the document with respect to the query, the determining comprising: receiving quality of result data for a query and a plurality of versions of a document, the quality of result data specifying a version specific quality of result statistic for each of the versions of the document with respect to the query; determining a weighted overall quality of result statistic for the document with respect to the query, wherein determining the weighted overall quality of result statistic comprises weighting each version specific quality of result statistic and combining the weighted version-specific quality of result statistics, wherein each quality of result statistic is weighted by a weight determined from at least a difference between content of a reference version of the document and content of the version of the document corresponding to the version specific quality of result statistic; and storing the weighted overall quality of result statistic and data associating the query and the document with the weighted overall quality of result statistic. Other embodiments of this aspect include corresponding computer systems, apparatus, and computer programs recorded on one or more computer storage devices, each configured to perform the operations of the methods. A system of one or more computers can be configured to perform particular operations by virtue of there being software, firmware, hardware, or a combination of them installed on the system that in operation cause the system to perform the operations. A computer program can be configured to perform particular operations by virtue its including instructions that, when executed by data processing apparatus, cause the apparatus to perform the operations.

These and other embodiments can each optionally include one or more of the following features. Each of the plurality of versions of the document is stored at a same address. The address is a Uniform Resource Locator. The reference version of the document is a version of the document that was most-recently crawled by a web-crawler. Determining the weighted overall quality of result statistic comprises: determining a respective difference score for each of the plurality of versions of the document with reference to the reference version of the document, wherein the difference score for a particular version in the plurality of versions of the document and the reference version of the document measures a difference between a representation of the particular version and a representation of the reference version of the document; and weighting each version specific quality of result statistic by a weight derived from the difference score for the version of the document associated with the version specific quality of result statistic.

The representation of a version of the document comprises shingles extracted from the version of the document. The representation of a version of the document comprises a time distribution of shingles in the version of the document.

The actions further include storing data associating the query and the document with a non-weighted overall quality of result statistic; receiving the query, and in response to receiving the query, determining whether to select either the weighted overall quality of result statistic or the non-weighted overall quality of result statistic; selecting either the weighted overall quality of result statistic or the non-weighted overall quality of result statistic in response to the determination; and providing the selected overall quality of result statistic to a ranking engine implemented on one or more computers. The actions further include determining a difference score for the reference version of the document and a current version of the document, and wherein selecting either the weighted overall quality of result statistic or non-weighted overall quality of result statistic comprises selecting a statistic according to the difference score.

The actions further include receiving an indication that the document has changed; and updating the weighted overall quality of result statistic in response to the indication.

Particular embodiments of the subject matter described in this specification can be implemented so as to realize one or more of the following advantages. A search system can determine when a document responsive to a search query has changed, and can accordingly modify data indicating past user behavior that is used to rank the search result. When a document changes, the document can be ranked using indicators that more closely represent the current content of the document, rather than past content of the document.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
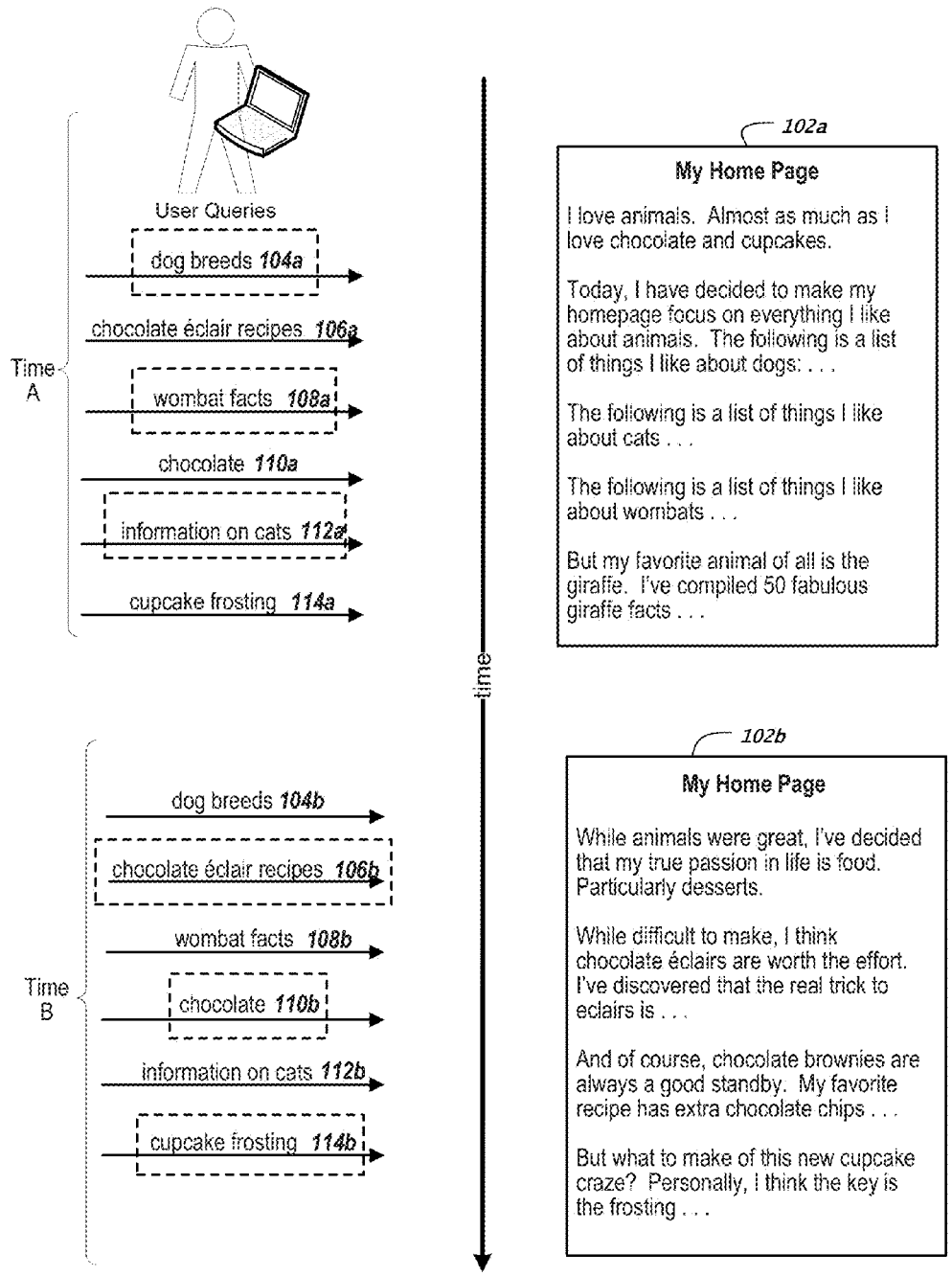
FIG. 1 illustrates two versions of an example document, as well as queries submitted over time.

FIG. 1 illustrates two versions of an example document 102, as well as queries submitted over time. The example document 102 is a web page.

Some documents change over time. A document changes when the content of the document changes, e.g., when content stored at the address of the document such as the URL of the document, changes. For example, an author of a document can add, delete, or modify the content of the document. Thus, over time, a given document can have multiple versions each stored at the address of the document. Any version stored at the address of the document is considered to be a version of the document.

FIG. 1 illustrates two different versions of document 102. Version A 102a is the version of the document during time A. Version B 102b is the version of the document during time B.

As the document changes over time, user behavior in relation to the document also changes. During time A, when a search result corresponding to the first version 102a of the document is presented to users, users only select the search result for the document for certain queries. For example, users select the search result for version 102a in response to the queries "dog breeds" 104a, "wombat facts" 108a, and "information on cats" 112a.

However, users did not select the search result for version 102a in response to the queries "chocolate éclair recipes" 106a, "chocolate" 110a, or "cupcake frosting" 114a.

However, when the same queries are issued by users during time B, the users click on a search result corresponding to the version 102b of the document for different queries. For example, users selected the search result for version 102b in response to the queries "chocolate éclair recipes" 106b, "chocolate" 110b, and "cupcake frosting" 114b, but did not select the search result for version 102b in response to the queries "dog breeds" 104b, "wombat facts," 108b or "information on cats" 112b.

One indicator a search engine can use to rank documents responsive to a given query is a quality of result statistic that measures how good a result a given document is for the given query. The quality of result statistic can be derived from various indicators. One example indicator can be determined based on which documents users click on, i.e., select, when the documents are presented as search results for a given query.

However, when document content changes over time, the quality of result indicators derived for previous versions of the document are not necessarily accurate, as they are derived from data for old versions of the document.

One way to deal with this problem would be to ignore all prior quality of result statistics when the content of the document changes. However, while the shift from version 102a to 102b involves replacing all of the content that had been in version 102a, more subtle shifts between versions can also occur. Therefore, rather than ignoring all past quality of result statistics when a document changes, a search system can weight the quality of result statistics, for example, by a score derived from how much the document has changed. Example techniques for weighting the quality of result statistics are described in more detail below.

Figure 2:
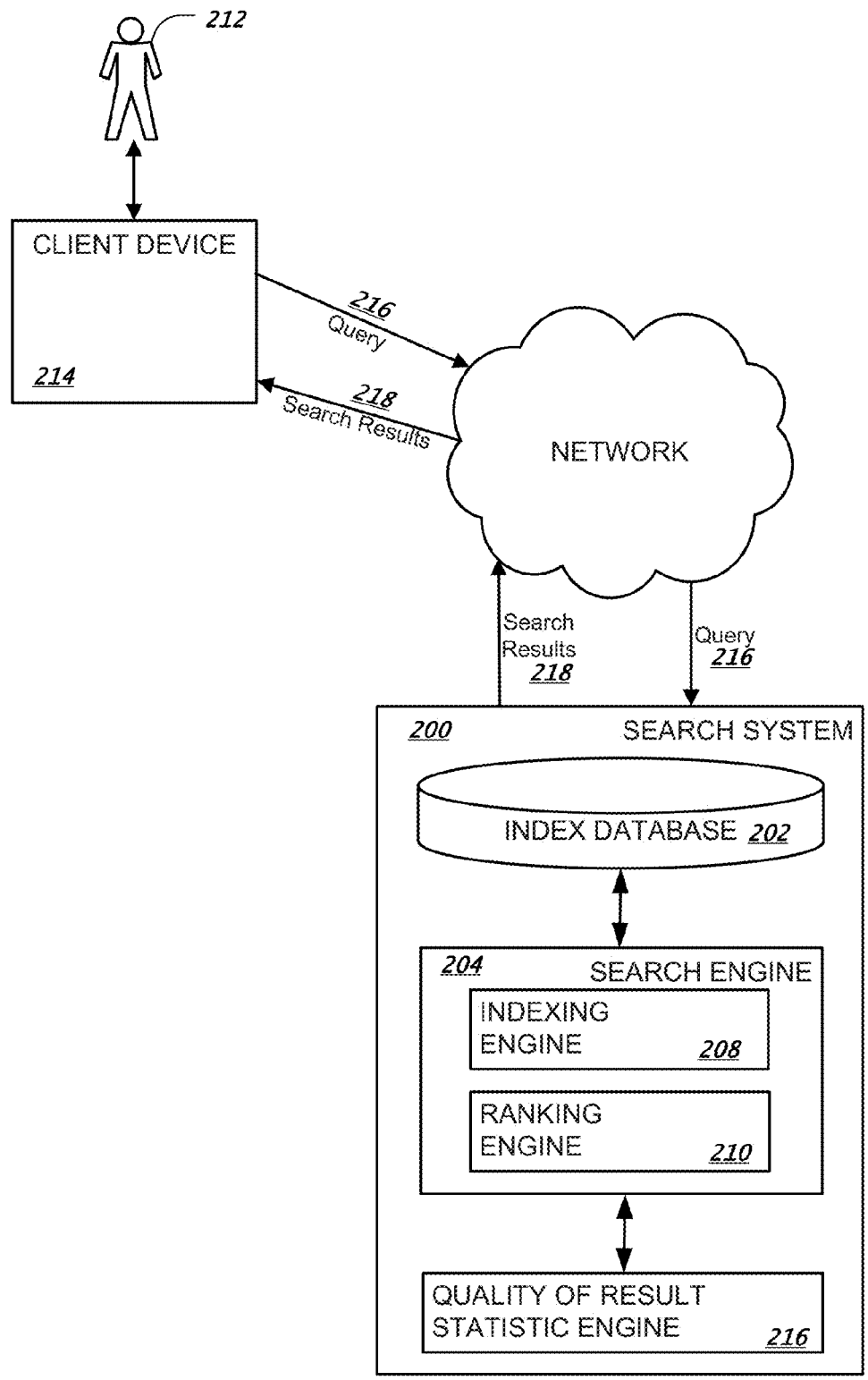
FIG. 2 illustrates an example search system for providing search results relevant to submitted queries

FIG. 2 illustrates an example search system 200 for providing search results relevant to submitted queries as can be implemented in an interne, an intranet, or another client and server environment. The search system 200 can be implemented as, for example, computer programs running on one or more computers in one or more locations that are coupled to each other through a network.

The search system 200 includes an index database 202 and a search engine 204. The index database 202 stores index data for documents. The search engine 204 includes an indexing engine 208 and a ranking engine 210*. The indexing engine 208 indexes documents.

The ranking engine 210 ranks documents in response to user queries. One indicator the ranking engine uses is an overall quality of result statistic, which can be weighted or non-weighted as described in more detail below. A quality of result statistic engine 216 generates weighted overall quality of result statistics for query-document pairs and optionally generates non-weighted overall quality of result statistics for query-document pairs. Each query-document pair consists of a query and a document. The quality of result statistic engine 216 provides either the weighted overall quality of result statistics or the non-weighted overall quality of result statistics to the ranking engine 210, as described in more detail below.

Figure 3:
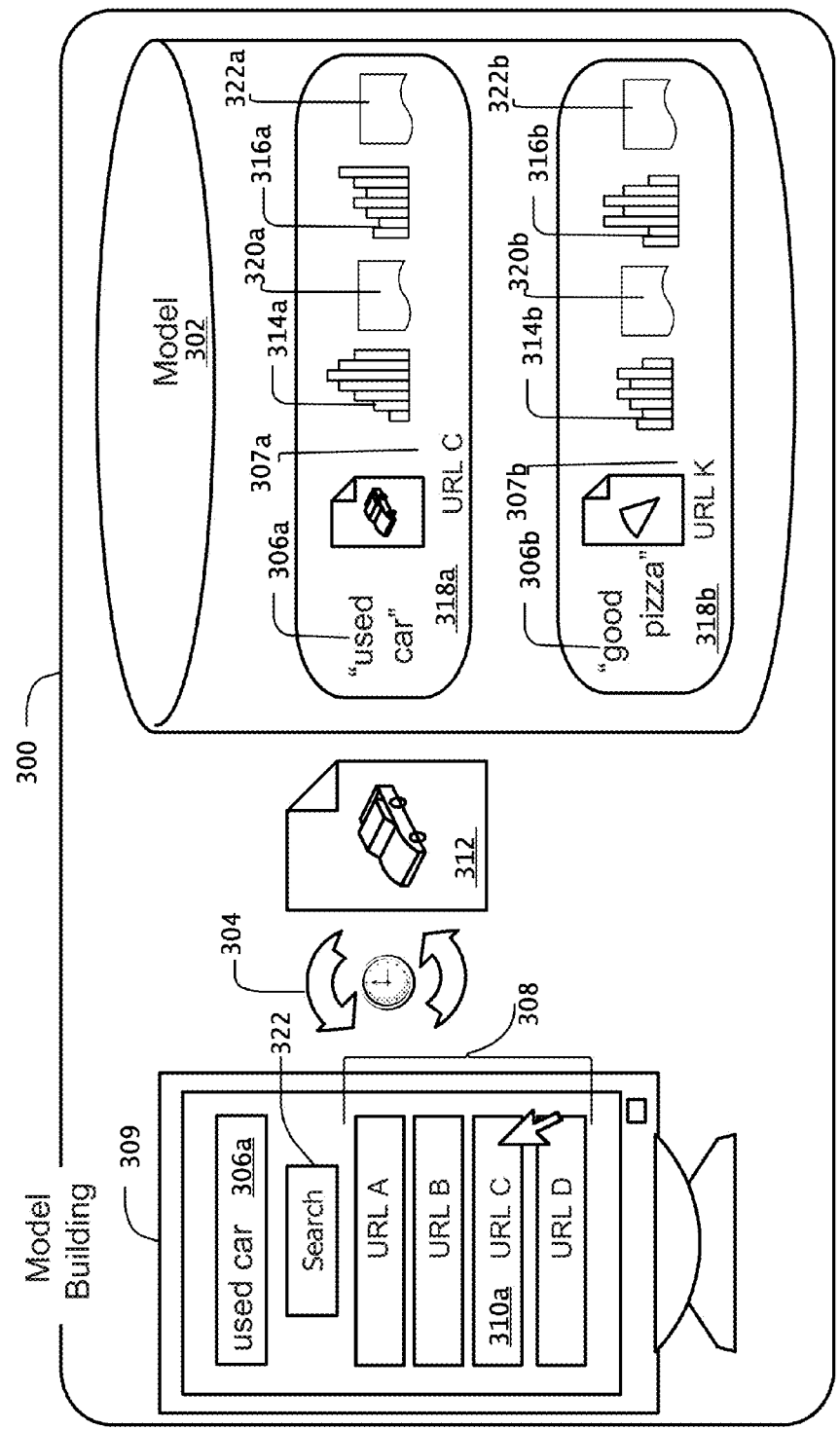
FIG. 3 illustrates building an example model database.

FIG. 3 illustrates building an example model database 302 for use with an information retrieval system. The model database 302 is one or more databases that store version-specific quality of result statistics for queries and versions of documents.

For illustrative purposes, FIG. 3 shows building a model that stores version-specific quality of result statistics for document versions. The version-specific quality of result statistics illustrated in FIG. 3 are determined based on user click data. However, other version-specific quality of result statistics can also be generated and used.

As shown in FIG. 3, a user submits a query 306a "used car," to a search engine through a graphical user interface 309 presented on a user device. In response to the user selecting the search button 322, a search engine returns a result list 308 which is an ordered (ranked) list of references to documents that are responsive to the query 306a. The result list 308 includes, for each document, a respective hyperlink that shows a document reference URL A, URL B, URL C (301a), and URL D. If a user selects (e.g., clicks) the hyperlink for URL C 310a in the result list 308, the user interface 309 (e.g., a web browser) obtains and presents the associated document 312.

The model database 302 stores records for documents that are selected by users from among documents presented in response to a query. Each record within the model 302 associates a query, an identifier of a document 310 selected by users in response to that query, and a respective version-specific quality of result statistic for each version of the document. For example, record 318a relates query 306a, an identifier 307a of URL C, for example a universal resource locator (URL), and version-specific quality of result statistics 314a and 316a for versions of the document at URL C with respect to the query 306a. The information used to generate the version-specific quality of result statistics can be aggregated or otherwise anonymized.

Each record can also include a representation of each version of the document for which version-specific quality of result statistics were generated. For example, record 318a stores representations 320a and 322a of URL C, and record 318b stores representations 320b and 322b of URL K. Version representations are described in more detail below, with reference to FIG. 4.

In some implementations, the document representations are created at the same time the rest of the model data is gathered and generated. In other implementations, the document representations are created separately from the rest of the model data, and the two types of data are merged at a later time to create the record.

In various implementations, the version-specific quality of result statistics stored in the model data are specific to a geographic location, e.g., a city, metropolitan region, state, country, or continent, specific to a language preference, or a combination of the two.

Figure 4:
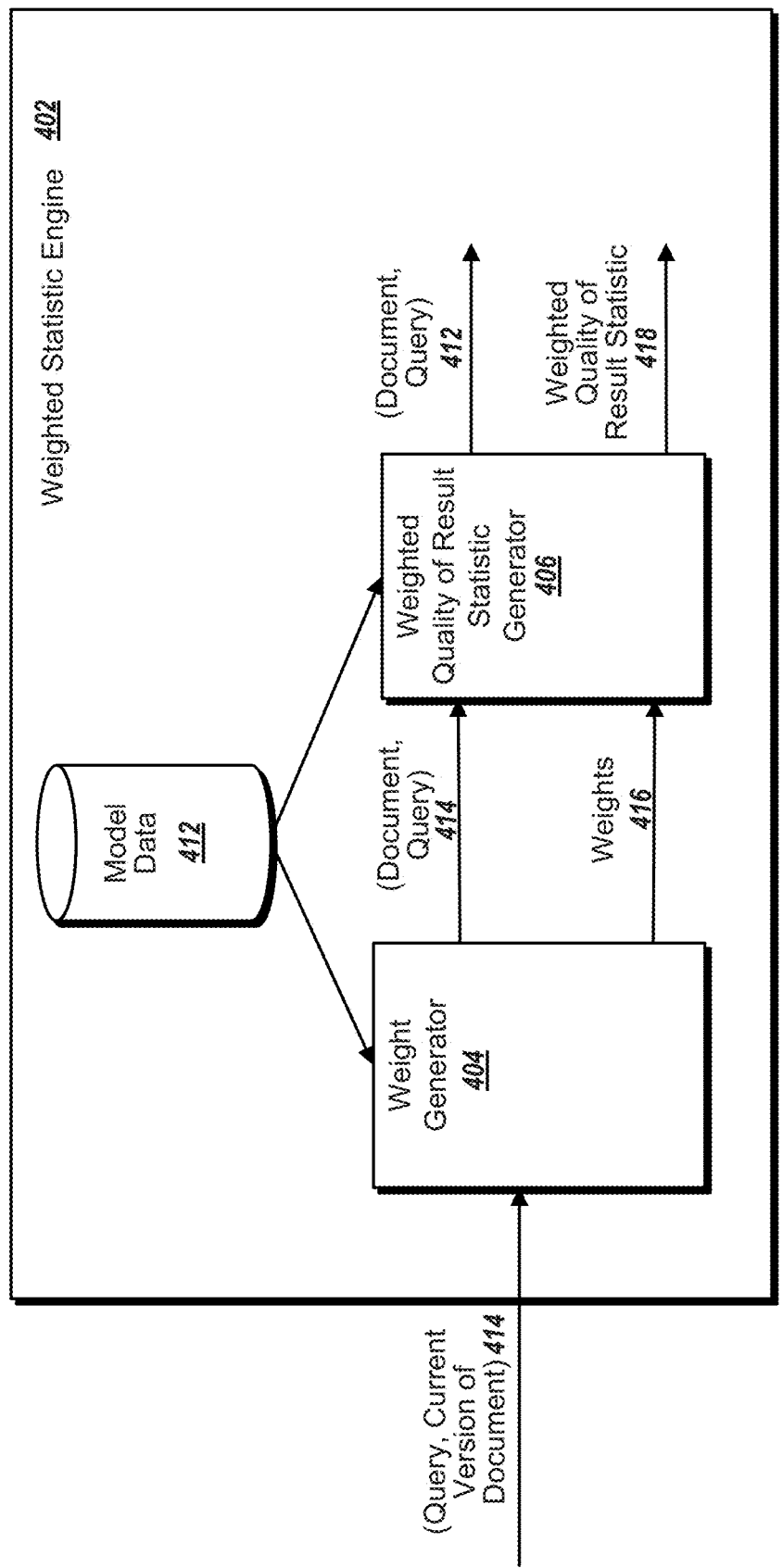
FIG. 4 illustrates an example weighted statistic engine that generates weighted quality of result statistics.

FIG. 4 illustrates an example weighted statistic engine 402 implemented on one or more computers. The weighted statistic engine 402 generates weighted overall quality of result statistics for one or more query-document pairs. The weighted statistic engine 402 is part of the quality of result statistic engine 216 described above with reference to FIG. 2. For illustrative purposes, the weighted statistic engine 402 will be described as generating the weighted overall quality of result statistics in advance and storing them for later use. However, the weighted statistic engine can alternatively generate the weighted overall quality of result statistics 408 in real time, as needed.

The weighted statistic engine 402 includes a weight generator 404 and a weighted quality of result statistic generator 406.

The weight generator 404 receives a query and a reference version of a document. The reference version of the document is a version of the document obtained by the search system. In some implementations, the reference version of the document is the most recent version of the document obtained by the search system at the time the weighted overall quality of result statistics are generated. For example, the reference version can be the latest version of the document obtained during a crawl of the Internet. The reference version of the document does not necessarily correspond to the actual version of the document at the time the weighted overall quality of result statistic is calculated.

The weight generator 404 processes model data 412 including quality of result data for multiple versions of the document and the query. The weight generator 404 determines an appropriate weight for version-specific quality of result statistics corresponding to each version of the document represented in the model data 412 for the document and the query. The weight for a given version is determined at least in part from an estimate of the difference between the given version of the document and the current version.

The representations of the versions of the documents can be stored in the model data 412. The versions of the documents can be represented in different ways. In some implementations, the representation of a version of a document is a time distribution of the shingles in the document. For example, shingles can be extracted from the version of the document, or from snippets of the version of the document. A snippet is, for example, one or more parts of the document that are identified as being significant for ranking purposes. Shingles are contiguous subsequences of tokens in a document. These shingle representations can be extracted while the model database is being built, for example, using conventional shingle-extracting techniques. Each shingle can then be associated with a particular time. The time can be, for example, the first time the shingle was ever observed in any version of any document by the system generating the representations of the versions, or the first time the shingle was ever observed in a version of the document itself. The distribution of the times associated with the shingles is then used as the representation of the version of the document.

In other implementations, the representation of a version of a document is the text of the document itself. In other implementations, the representation of a version of a document is text extracted from snippets of the document. In still other implementations, the representation of a version of a document is the shingles extracted from the document, or from snippets of the document.

In still other implementations, the representation of a version of a document is a document fingerprint of the document. The document fingerprint can be, for example, a hash value generated from shingles extracted from the document and having a length equal to or less than a predetermined length.

In some implementations, a document can be processed to identify non-boilerplate text, and the representation of a version of a document can be derived from just the non-boilerplate text in the document. Various algorithms for identifying boilerplate and non-boilerplate text can be used. For example, boilerplate text can be identified by comparing multiple related documents and identifying text that is common to all, or a majority, of the documents. Documents can be determined to be related, for example, when they are from the same domain. For example, if all of the related documents have common text in a similar physical location, e.g., on the left hand side of the documents or at the bottom of the documents, the common text can be determined to be boilerplate. Other conventional methods for identifying boilerplate text can also be used. The text that is not boilerplate text can then be identified as non-boilerplate text.

In some implementations, the difference between the two documents is represented as a difference score. The weight score generator 404 can use various techniques to calculate the difference score.

When a time distribution of shingles is used to represent the versions of the document, the difference score can be calculated by comparing the two time distributions for the two versions of the document. For example, the difference score can be derived from the distance between the mean of one distribution and the mean of the other distribution. Two versions of the document that are similar will have similar distributions and thus close means. In contrast, a version of the document that has changed dramatically from a previous version of the document will have a different distribution than the previous version. Because there will be more distance between the means of the distributions when the documents are different than when the documents are similar, the distance between the means of the distribution is a measure of how much the versions have changed. The difference score can alternatively or additionally be based on other factors, for example, a measure of the dispersion of the distribution.

When text from the versions of the document is used as the representation of the versions of the document, the entire text of both versions of the document, or text from the significant parts of the versions of the document, e.g., the parts of the documents that are identified as being significant for ranking purposes, can be compared, for example, using conventional text comparison techniques. For example, the longest common subsequence of the two versions can be identified and the percentage of the two versions that overlap can be computed from the length of the longest common subsequence and the length of the document versions.

When shingle representations are used to represent the versions of the document, the difference score can be derived from a comparison of shingle representations of each version of the document. For example, the system can compare the shingles to obtain a similarity score for the two versions of the documents, and then derive a difference score from the similarity score, e.g., by taking the inverse of the similarity score. A similarity score for the two versions of the document can be determined from a comparison of the shingles, e.g.:

$$\text{similarity}(A, B) = \frac{|S(A) \cap S(B)|}{|S(A) \cup S(B)|},$$

where A is the reference version of the document, B is the version of the document from the model data 412, S(X) is the set of shingles extracted from document X, and |S| is the number of elements in the set S.

Alternatively, the system can use various modified forms of the formula given above. For example, the system can use a formula where the shingles in each set are weighted according to their frequency in documents indexed by the search engine, e.g., according to their inverse document frequency.

As another example, the system can use the formula:

$$\text{similarity}(A, B) = \frac{|S(A) \cap S(B)|}{|S(A)|}.$$

This form of the formula gives greater importance of the changes to the newer version of the document.

When a fingerprint representation of the documents is used, the difference score can be calculated by comparing the fingerprint representations. For example, if each fingerprint is represented by multiple bits, each bit having a value of 1 or 0, the difference score can be calculated by taking an exclusive or of two document fingerprint representations, and then summing the resulting bits.

If multiple fingerprints are used to represent each document, the weight generator 404 can calculate the difference score by matching individual fingerprints for the two documents using best case matching, and summing the resulting bits of an exclusive or of each matching pair of fingerprints. In some implementations, the weight generator 404 further penalizes the difference score according to a factor derived from any ordering mismatch that results from the best case matching. Consider an example where version A of a document is represented by ordered fingerprints F1A, F2A, and F3A, version B of the document is represented by ordered fingerprints F1B, F2B, and F3B, and the best case matching is F1A matched with F1B, F2A matched with F3B, and F3A matched with F2B. In this example, the weight generator 404 can calculate the exclusive or of F1A and F1B, the exclusive or of F2A and F3B, and the exclusive or of F3A and F2B. The weight generator 404 can then sum the bits of the resulting exclusive or values. Because the fingerprints were not matched in order, the system can then apply a penalty factor to the difference score.

Once the weight generator 404 calculates the difference score, the weight generator calculates the appropriate weight for the version-specific quality of result statistics for the version of the document in the model data. The appropriate weight can be based on factor scores for one or more factors. These one or more factors can be combined according to a pre-defined function that maps scores for the factors to a corresponding weight. For example, the weight can be derived from a polynomial of factor values and constants. The function can be hand-tuned manually, or can be derived, for example, using machine learning techniques. Example factors include the difference score, the number of times the document changed subsequent to the time the historical version of the document was first detected, the amount of time the historical version of the document was unchanged, the amount of time subsequent versions of the document were unchanged, and the amount of data that has been collected for subsequent versions of the document. Other factors that are external to the versions of the document can also be used. The difference score measures the difference between the reference version of the document and the historical version of the document, as described above. In general, difference scores indicating larger differences should result in smaller weights than difference scores indicating smaller differences.

The number of times the document changed subsequent to the time the historical version of the document was detected can serve as a proxy for the age of the document or the frequency with which a document is updated. Versions that are older or that are for a document that is updated more frequently since the historical version of the document was detected generally should have lower weights that versions that are newer or for a document that is updated less frequently since the historical version of the document was detected. Therefore, the larger the number of times the document changed since the version was detected, the lower the weight for version-specific quality of result statistics for the document version and the query should be. This can be reflected in the function, for example, by raising a constant weight that is less than one to an exponent equal to the number of times the document changed since the version was created. Alternatively, the overall number of times the document changed can be used instead of the overall number of times the document changed since the version was detected.

The amount of time subsequent versions of the document went unchanged can serve as a proxy for the quality of data associated with more recent versions of the document. In general, the longer the amount of time any subsequent version of the document was unchanged, the lower the weight associated with the historical version of the document should be.

The amount of data that has been collected for subsequent versions of the document can serve as an indicator of whether the data for the historical version will be useful. In general, the more data that has been collected for subsequent versions of the document, the lower the weight for the historical version should be.

The weight generator 404 can use the difference score itself, or a weight derived from the difference score. For example, the weight generator 404 can use a function that takes the difference score as an input and generates a corresponding weight. The function can be, for example, a linear function, a quadratic function, a step function, or any other type of function. The function can be hand-tuned manually, or can be derived, for example, using machine learning techniques.

The weighted quality of result statistic generator 406 receives an identification of the document and the query 414 along with the weights 416 for the different versions of the document in the model data 412. The weighted quality of result statistic generator 406 can use various conventional methods to combine the weighted version-specific quality of result statistics for each version of the document to generate a weighted overall quality of result statistic for the query and the document.

Once the weighted overall quality of result statistic is generated for a query and a document, data associating the query and the document with the corresponding weighted overall quality of result statistics can be stored, for example, in a database of weighted overall quality of result statistics.

Figure 5:
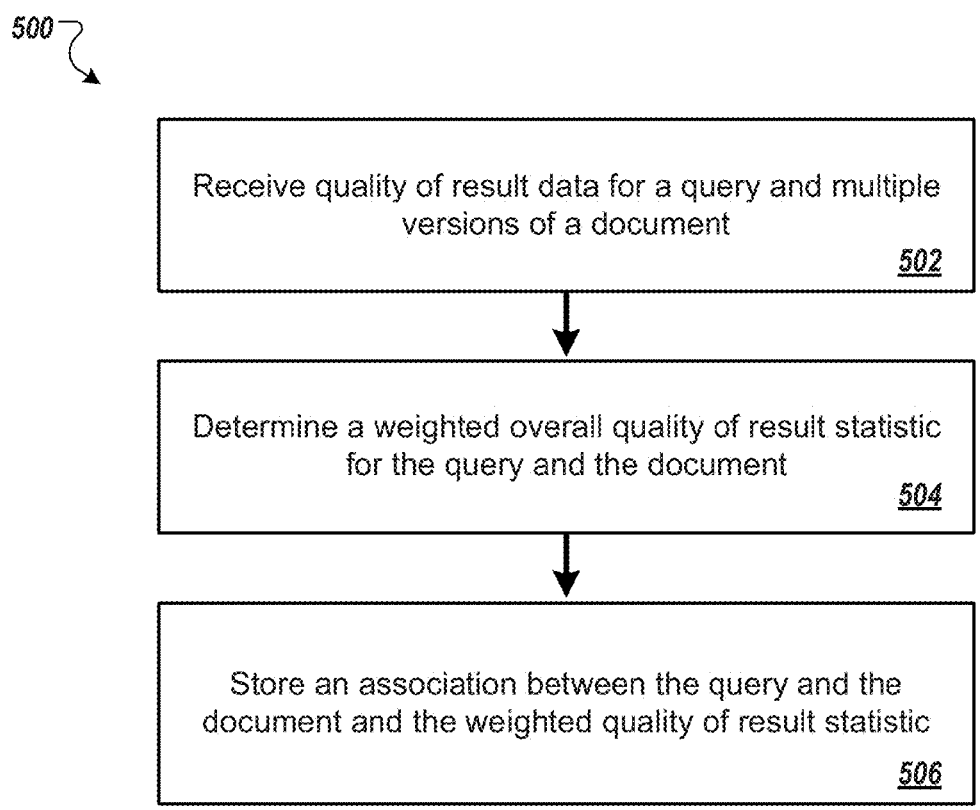
FIG. 5 illustrates an example method for generating a weighted overall quality of result statistic.

FIG. 5 illustrates an example method 500 for generating a weighted overall quality of result statistic. For convenience, the example method 500 will be described in reference to a system that performs the method 500. The system can be, for example, the quality of result statistic engine 216 described above with reference to FIG. 2, or another system of one or more computers.

The system receives quality of result data for a query and multiple versions of a document (502). The quality of result data includes a respective version-specific quality of result statistic for the query with respect to each of the versions of the document.

The system determines a weighted overall quality of result statistic for the query and the document (504), for example, as described above with reference to FIG. 4.

The system stores data associating the query and the document with the weighted overall quality of result statistic (506), for example, in the database of weighted overall quality of result statistics described above with reference to FIG. 4.

In some implementations, the system further stores data associating the query and the document with a non-weighted overall quality of result statistic for the query and the document. The non-weighted overall quality of result statistic can be generated by combining the version-specific quality of result statistics for each version of the document, either without weighting the version-specific quality of result statistics or by weighting the version-specific quality of result statistics by a weight derived from factors other than those derived from the differences between versions of the document. Examples of such factors are described above with reference to FIG. 4.

In some implementations, the system penalizes the weighted or non-weighted overall quality of result statistic for a given document and query when the given document does not change very much over time and other documents responsive to the given query, for example, the other documents with the highest overall quality of result statistics, do change over time. Change can be measured, for example, as the frequency with which document content changes or the amount of content that changes. The amount of content can be measured, for example, by a difference score. For example, the system can determine whether the amount of change of the given document, either frequency of change or amount of content is low relative to the amount of change of other documents responsive to the given query. If so, the system can penalize the overall or non-weighted quality of result statistic for the given document and the given query, e.g., by reducing the value of the statistic. An amount of change is low relative to the amount of change of other documents responsive the query, for example, when it is less than a threshold value computed from the amount of change of the other documents responsive to the query.

In some implementations, the system receives an indication that the document has changed. For example, a search system may periodically crawl the Internet to update documents stored in its index. During the crawl, the search system can determine that the document has changed and send a signal indicating the change to the system. In response to receiving the indication that the document has changed, the system can update the weighted overall quality of result statistic. The system can update the weighted overall quality of result statistic, for example, by re-calculating difference scores between the new version of the document and the versions stored in the model data, and then re-weighting the version-specific quality of result statistics according to the new difference scores.

Figure 6:
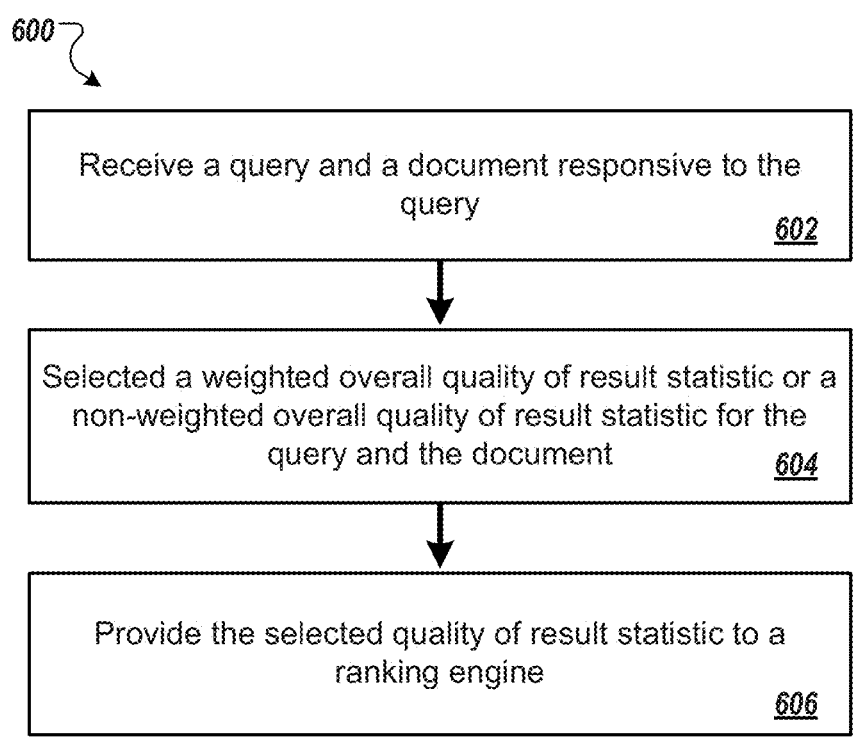
FIG. 6 illustrates an example method for determining whether to provide a weighted or a non-weighted overall quality of result statistic to a ranking engine.

FIG. 6 illustrates an example technique 600 for determining whether to provide a weighted or a non-weighted overall quality of result statistic to a ranking engine. For convenience, the example technique 600 will be described in reference to a system that performs the technique 600. The system can be, for example, the search engine 204 described above with reference to FIG. 2.

The system receives a query and a document responsive to the query (602).

The system selects a weighted overall quality of result statistic or a non-weighted overall quality of result statistic for the query and the document (604). The system can make this selection based on one or more factors.

For example, the system can make the selection by comparing one or more factors to a respective threshold, and selecting the weighted overall quality of result statistic if each threshold is satisfied, and otherwise selecting the non-weighted quality of result statistic. Alternatively, the system can combine scores for one or more individual factors into a combined score and select the weighted overall quality of result statistic if the combined score satisfies the threshold and otherwise select the non-weighted quality of result statistic. These one or more factors can be combined according to a pre-defined function that maps scores for the factors to a corresponding weight. For example, the weight can be derived from a polynomial of factor values and constants. The function can be hand-tuned manually, or can be derived, for example, using machine learning techniques. While the above describes selecting the weighted overall quality of result statistic if one or more thresholds are satisfied, in alternative implementations, the system can select the non-weighted quality of result statistic if the one or more thresholds are satisfied.

One factor the system can consider is a difference score that represents a degree of difference between a most recently crawled version of the document and the version of the document at the time the weighted overall quality of result statistic was generated. If the versions are different enough, the system uses the non-weighted overall quality of result statistic. This is because the weights used to generate the weighted overall quality of result statistic do not accurately reflect the most recently crawled version of the document. The system can determine the difference score between the two versions, for example, as described above with reference to FIG. 4. The system can then determine whether the difference score satisfies a difference threshold. If so, the system does not select the weighted overall quality of result statistic, and instead selects the non-weighted overall quality of result' statistic. Otherwise, the system selects the weighted overall quality of result statistic. The threshold can be determined empirically, for example, from an analysis of difference scores for versions of documents whose difference is determined to be small enough that the weighted overall quality of result statistic should be selected and versions of documents whose difference is determined to be large enough that the weighted overall quality of result statistic should not be selected.

Another factor the system can consider is how frequently the content of the documents change. Some documents, for example, the home page of a news website, have frequent turnover in content. If the system determines the turnover frequency satisfies a threshold, the system can use the non-weighted overall quality of result statistic instead of the weighted overall quality of result statistic, for example, because the weighted overall quality of result statistic reflects a single moment in the frequently changing history of the document. Because the document changes frequently, it is unlikely that the current version of the document is the same as the version of the document at the time the weighted overall quality of result statistic was calculated. Therefore, the weighted overall quality of result statistic is likely less accurate than the non-weighted overall quality of result statistic, e.g., because the weights used to calculate the weighted overall quality of result statistic are biased in the wrong direction. The system can determine how often the content of the page changes, for example, by determining how often new versions of the document are recorded and also comparing the versions of the document, for example, as described above with reference to FIG. 4, to determine the magnitude of the change between each version.

Yet another factor the system can consider is whether the content of other documents responsive to the query frequently change. The system can identify a top number of documents responsive to the query (e.g., according to a ranking assigned to the documents by the search engine). The system can then determine whether the frequency with which those documents change satisfies a threshold. For example, the system can compare the frequency with which each identified document changes to a first threshold. The system can then count the number of identified documents that change more frequently than the first threshold and compare that number to a second threshold. If the number exceeds the second threshold, the system can determine that the documents responsive to the query change frequently, and therefore, the non-weighted overall quality of result statistic should be used for documents with respect to the query.

Another factor the system can consider is a categorization of the query. The categorization can be received from one or more components of the search engine. For example, some queries may be categorized as seeking recent information. If a query is categorized as seeking recent information, the weighted overall quality of result statistic can be used. This is because if a user is seeking recent information, greater weight should be given to versions of the document that are most likely to answer the user's question, i.e., to the most recent versions of the documents.

For example, some queries might be categorized as related to sports, or celebrities, or as having a commercial purpose. Each category of query can be associated with data indicating whether the weighted or non-weighted overall quality of result statistic should be used. The appropriate overall quality of result statistic can then be identified according to the category of query. For example, some categories, such as celebrities, can be associated with data indicating that the weighted quality of result statistic should be used, because these queries are more likely to be seeking the latest information.

In some implementations, if the system determines that information relevant to the query would not have existed prior to a particular date, the system can calculate a new weighted overall quality of result statistic to minimize the impact of data collected before the particular date. For example, if the query is for "Results of Summer Olympics 2008," the system can determine that data prior to 2008 will not be relevant to the query. In some implementations, the system stores weights for each version of the document, calculated as described above, re-weights versions before the particular date to have a zero weight, and re-calculates the weighted overall quality of result statistic as needed. In other implementations, the system stores weighted overall quality of result statistics for several dates (for example, in five year increments), and uses the weighted overall quality of result statistic for the closest date.

The system then provides the selected overall quality of result statistic to a ranking engine that scores documents based at least in part on an overall quality of result statistic (606). For example, the selected overall quality of result statistic 606 can be provided to the ranking engine 210 described above with reference to FIG. 2.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more computers executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic; magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The central processing unit and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   receiving a query and a current version of a document;
   receiving quality of result data for a plurality of versions of the document and the query, the quality of result data specifying a respective version-specific quality of result statistic for each of the versions of the document with respect to the query;
   calculating a weight for the version-specific quality of result statistics corresponding to each version of the document, wherein the weight for a particular version of the document is determined at least in part on an estimate of a difference between the particular version and the current version of the document, and wherein calculating the weight for a particular version of the document comprises:
    obtaining a representation of the particular version of the document, wherein the representation is a first time distribution of shingles,
    calculating a difference score by comparing the first time distribution of shingles representing the particular version of the document to a second time distribution of shingles representing the current version of the document, wherein each shingle is a contiguous subsequence of one or more tokens in the document, and wherein each shingle is associated with a particular time that the shingle is first observed in a version of the document such that a distribution of the times associated with the shingles in a version of the document corresponds to the representation of the version of the document, and
    using the difference score to calculate a corresponding weight for the particular version of the document;
determining a weighted overall quality of result statistic for the document with respect to the query, wherein determining the weighted overall quality of result statistic comprises weighting each version-specific quality of result statistic with the calculated weight and combining the weighted version-specific quality of result statistics; and
associating the weighted overall quality of result statistic with the document.

2. The method of claim 1, wherein each of the plurality of versions of the document is stored at a same address at a different respective period of time.

3. The method of claim 2, wherein the address is a Uniform Resource Locator.

4. The method of claim 1, wherein the reference version of the document is a version of the document that was most-recently crawled by a web-crawler.

5. The method of claim 1, wherein determining the weighted overall quality of result statistic comprises:
    determining a respective difference score for each of the plurality of versions of the document with reference to the reference version of the document, wherein the difference score for a particular version in the plurality of versions of the document and the reference version of the document measures a difference between a representation of the particular version and a representation of the reference version of the document; and
    weighting each version-specific quality of result statistic by a weight derived from the difference score for the version of the document associated with the version-specific quality of result statistic.

6. The method of claim 5, wherein the representation of a version of the document comprises shingles extracted from the version of the document.

7. The method of claim 5, wherein the representation of a version of the document comprises a time distribution of shingles in the version of the document.

8. The method of claim 1, further comprising:
    associating the document with a non-weighted overall quality of result statistic;
    receiving the query, and in response to receiving the query, determining whether to select either the weighted overall quality of result statistic or the non-weighted overall quality of result statistic;
    selecting either the weighted overall quality of result statistic or the non-weighted overall quality of result statistic in response to the determination; and
    providing the selected overall quality of result statistic to a ranking engine implemented on one or more computers.

9. The method of claim 8, further comprising determining a difference score for the reference version of the document and a current version of the document, and wherein selecting either the weighted overall quality of result statistic or non-weighted overall quality of result statistic comprises selecting a statistic according to the difference score.

10. The method of claim 1, further comprising:
    receiving an indication that the document has changed; and
    updating the weighted overall quality of result statistic in response to the indication.

11. The method of claim 5, wherein the difference score is determined as an inverse of a similarity score, where the similarity score is defined as $$\text{similarity}(A, B) = \frac{|S(A) \cap S(B)|}{|S(A) \cup S(B)|},$$

where A is the particular version of the document and B is the reference version of the document.

12. The method of claim 5, wherein the difference score is determined as an inverse of a similarity score, where the similarity score is defined as $$\text{similarity}(A, B) = \frac{|S(A) \cap S(B)|}{|S(A)|},$$

where A is the particular version of the document and B is the reference version of the document.

13. The method of claim 1, wherein calculating the weight further comprises calculating a number of times the document has changed as compared to a reference version of the document or an amount of time the reference version of the document was unchanged.

14. A system comprising:
    one or more computers configured to perform operations, the operations comprising:
        receiving a query and a current version of a document;
        receiving quality of result data for a plurality of versions of the document and the query, the quality of result data specifying a respective version-specific quality of result statistic for each of the versions of the document with respect to the query;
        calculating a weight for the version-specific quality of result statistics corresponding to each version of the document, wherein the weight for a particular version of the document is determined at least in part on an estimate of a difference between the particular version and the current version of the document, and wherein calculating the weight for a particular version of the document comprises:
            obtaining a representation of the particular version of the document, wherein the representation is a first time distribution of shingles,
            calculating a difference score by comparing the first time distribution of shingles representing the particular version of the document to a second time distribution of shingles representing the current version of the document, wherein each shingle is a contiguous subsequence of one or more tokens in the document, and wherein each shingle is associated with a particular time that the shingle is first observed in a version of the document such that a distribution of the times associated with the shingles in a version of the document corresponds to the representation of the version of the document, and using the difference score to calculate a corresponding weight for the particular version of the document;

determining a weighted overall quality of result statistic for the document with respect to the query, wherein determining the weighted overall quality of result statistic comprises weighting each version-specific quality of result statistic with the calculated weight and combining the weighted version-specific quality of result statistics; and associating the weighted overall quality of result statistic with the document.

15. The system of claim 14, wherein each of the plurality of versions of the document is stored at a same address at a different respective period of time.

16. The system of claim 15, wherein the address is a Uniform Resource Locator.

17. The system of claim 14, wherein the reference version of the document is a version of the document that was most-recently crawled by a web-crawler.

18. The system of claim 14, wherein determining the weighted overall quality of result statistic comprises:

determining a respective difference score for each of the plurality of versions of the document with reference to the reference version of the document, wherein the difference score for a particular version in the plurality of versions of the document and the reference version of the document measures a difference between a representation of the particular version and a representation of the reference version of the document; and weighting each version-specific quality of result statistic by a weight derived from the difference score for the version of the document associated with the version-specific quality of result statistic.

19. The system of claim 18, wherein the representation of a version of the document comprises shingles extracted from the version of the document.

20. The system of claim 18, wherein the representation of a version of the document comprises a time distribution of shingles in the version of the document.

21. The system of claim 14, wherein the operations further comprise:

associating the document with a non-weighted overall quality of result statistic;

receiving the query, and in response to receiving the query, determining whether to select either the weighted overall quality of result statistic or the non-weighted overall quality of result statistic;

selecting either the weighted overall quality of result statistic or the non-weighted overall quality of result statistic in response to the determination; and providing the selected overall quality of result statistic to a ranking engine implemented on one or more computers.

22. The system of claim 21, wherein the operations further comprise determining a difference score for the reference version of the document and a current version of the document, and wherein selecting either the weighted overall quality of result statistic or non-weighted overall quality of result statistic comprises selecting a statistic according to the difference score.

23. The system of claim 14, wherein the operations further comprise:

receiving an indication that the document has changed; and updating the weighted overall quality of result statistic in response to the indication.

24. The system of claim 18, wherein the difference score is determined as an inverse of a similarity score, where the similarity score is defined as $$\text{similarity}(A, B) = \frac{|S(A) \cap S(B)|}{|S(A) \cup S(B)|},$$

where A is the particular version of the document and B is the reference version of the document.

25. The system of claim 18, wherein the difference score is determined as an inverse of a similarity score, where the similarity score is defined as $$\text{similarity}(A, B) = \frac{|S(A) \cap S(B)|}{|S(A)|},$$

where A is the particular version of the document and B is the reference version of the document.

26. The system of claim 14, wherein calculating the weight further comprises calculating a number of times the document has changed as compared to a reference version of the document or an amount of time the reference version of the document was unchanged.

27. A computer-readable medium having instructions stored thereon, which, when executed by a processor, cause the processor to perform operations comprising:

receiving a query and a current version of a document;

receiving quality of result data for a plurality of versions of the document and the query, the quality of result data specifying a respective version-specific quality of result statistic for each of the versions of the document with respect to the query;

calculating a weight for the version-specific quality of result statistics corresponding to each version of the document, wherein the weight for a particular version of the document is determined at least in part on an estimate of a difference between the particular version and the current version of the document, and wherein calculating the weight for a particular version of the document comprises:

obtaining a representation of the particular version of the document, wherein the representation is a first time distribution of shingles, calculating a difference score by comparing the first time distribution of shingles representing the particular version of the document to a second time distribution of shingles representing the current version of the document, wherein each shingle is a contiguous subsequence of one or more tokens in the document, and wherein each shingle is associated with a particular time that the shingle is first observed in a version of the document such that a distribution of the times associated with the shingles in a version of the document corresponds to the representation of the version of the document, and using the difference score to calculate a corresponding weight for the particular version of the document;

determining a weighted overall quality of result statistic for the document with respect to the query, wherein determining the weighted overall quality of result statistic comprises weighting each version-specific quality of result statistic with the calculated weight and combining the weighted version-specific quality of result statistics; and associating the weighted overall quality of result statistic with the document.

28. The computer-readable medium of claim 27, wherein each of the plurality of versions of the document is stored at a same address at a different respective period of time.

29. The computer-readable medium of claim 28, wherein the address is a Uniform Resource Locator.

30. The computer-readable medium of claim 27, wherein the reference version of the document is a version of the document that was most-recently crawled by a web-crawler.

31. The computer-readable medium of claim 27, wherein determining the weighted overall quality of result statistic comprises:

determining a respective difference score for each of the plurality of versions of the document with reference to the reference version of the document, wherein the difference score for a particular version in the plurality of versions of the document and the reference version of the document measures a difference between a representation of the particular version and a representation of the reference version of the document; and weighting each version-specific quality of result statistic by a weight derived from the difference score for the version of the document associated with the version-specific quality of result statistic.

32. The computer-readable medium of claim 31, wherein the representation of a version of the document comprises shingles extracted from the version of the document.

33. The computer-readable medium of claim 31, wherein the representation of a version of the document comprises a time distribution of shingles in the version of the document.

34. The computer-readable medium of claim 27, further comprising:

associating the document with a non-weighted overall quality of result statistic;

receiving the query, and in response to receiving the query, determining whether to select either the weighted overall quality of result statistic or the non-weighted overall quality of result statistic;

selecting either the weighted overall quality of result statistic or the non-weighted overall quality of result statistic in response to the determination; and providing the selected overall quality of result statistic to a ranking engine implemented on one or more computers.

35. The computer-readable medium of claim 34, further comprising determining a difference score for the reference version of the document and a current version of the document, and wherein selecting either the weighted overall quality of result statistic or non-weighted overall quality of result statistic comprises selecting a statistic according to the difference score.

36. The computer-readable medium of claim 27, further comprising:

receiving an indication that the document has changed; and updating the weighted overall quality of result statistic in response to the indication.

37. The computer-readable medium of claim 31, wherein the difference score is determined as an inverse of a similarity score, where the similarity score is defined as $$\text{similarity}(A, B) = \frac{|S(A) \cap S(B)|}{|S(A) \cup S(B)|},$$

where A is the particular version of the document and B is the reference version of the document.

38. The computer-readable medium of claim 31, wherein the difference score is determined as an inverse of a similarity score, where the similarity score is defined as $$\text{similarity}(A, B) = \frac{|S(A) \cap S(B)|}{|S(A)|},$$

where A is the particular version of the document and B is the reference version of the document.

39. The computer-readable medium of claim 27, wherein calculating the weight further comprises calculating a number of times the document has changed as compared to a reference version of the document or an amount of time the reference version of the document was unchanged.

* * * * *